(12) United States Patent
Lee et al.

(10) Patent No.: US 7,240,615 B2
(45) Date of Patent: Jul. 10, 2007

(54) SELF-DAMPENING INK COMPOSITIONS AND METHOD FOR LITHOGRAPHIC PRINTING USING THE SAME

(75) Inventors: Christian John Lee, Parsippany, NJ (US); Olgierd Wasilewski, Naples, FL (US); Richard Durand, Jr., Oradell, NJ (US)

(73) Assignee: Sun Chemical Corp., Parsippany, NJ (US)

( * ) Notice: Subject to any disclaimer, the term of this patent is extended or adjusted under 35 U.S.C. 154(b) by 0 days.

(21) Appl. No.: 10/617,495

(22) Filed: Jul. 11, 2003

(65) Prior Publication Data

US 2004/0013983 A1   Jan. 22, 2004

Related U.S. Application Data

(62) Division of application No. 10/117,910, filed on Apr. 8, 2002.

(51) Int. Cl.
*B41F 5/00*   (2006.01)
*C09D 11/02*   (2006.01)

(52) U.S. Cl. .................. 101/450.1; 101/451; 101/106; 101/31.13; 101/31.25; 101/31.26

(58) Field of Classification Search ............. 101/450.1, 101/130, 13, 451; 106/31.13, 31.25, 31.26
See application file for complete search history.

(56) References Cited

U.S. PATENT DOCUMENTS

| | | | |
|---|---|---|---|
| 1,958,311 A | 5/1934 | Mehl | 134/35 |
| 2,090,704 A | 8/1937 | Rowell | 134/35 |
| 4,918,517 A | 4/1990 | Burgoon | 358/101 |
| 4,981,517 A | 1/1991 | DeSanto, Jr. et al. | 106/28 |
| 5,098,478 A | 3/1992 | Krishnan et al. | 106/23 |
| 5,158,606 A | 10/1992 | Carlick et al. | 524/145 |
| 5,372,067 A | 12/1994 | Doyle | 101/148 |
| 5,372,635 A | 12/1994 | Wasilewski et al. | 106/27 B |
| 5,389,130 A | 2/1995 | Batlaw et al. | 106/20 RO |
| 5,725,646 A * | 3/1998 | Krishnan et al. | 106/31.73 |
| 5,778,789 A * | 7/1998 | Krishnan et al. | 101/450.1 |
| 6,140,392 A | 10/2000 | Kingman et al. | 523/160 |
| 6,200,372 B1 | 3/2001 | Krishnan et al. | 106/31.73 |

FOREIGN PATENT DOCUMENTS

| | | | |
|---|---|---|---|
| EP | 0 079 764 | * | 5/1983 |
| GB | 1 336 356 | * | 11/1973 |

* cited by examiner

*Primary Examiner*—Hoa Van Le
(74) *Attorney, Agent, or Firm*—Dickstein, Shapiro, LLP.

(57) ABSTRACT

A self-dampening ink composition and methods for lithographic printing using a single fluid lithographic ink are provided in the invention in which the composition comprises glycerol in an amount greater than 0 to about 10 percent by weight, a nonionic surfactant with an HLB value of about 8 to about 20 in an amount from about 0.25 to about 2 percent by weight, and water in an amount of about 20 to about 50 percent by weight.

18 Claims, No Drawings

… (1 / 2)

SELF-DAMPENING INK COMPOSITIONS AND METHOD FOR LITHOGRAPHIC PRINTING USING THE SAME

This application is a Divisional of U.S. patent application Ser. No. 10/117,910, filed Apr. 8, 2002, entitled "SELF-DAMPENING INK COMPOSITIONS AND METHOD FOR LITHOGRAPHIC PRINTING USING THE SAME", now pending.

FIELD OF THE INVENTION

The present invention relates to the field of printing ink compositions. More particularly, it relates to single fluid lithographic printing ink compositions for use in lithographic printing processes. Use of single fluid lithographic ink compositions eliminates the need for separate application of water or other dampening solutions to be used in the printing process.

BACKGROUND OF THE INVENTION

Description of the Related Art

Lithography is a printing process that relies on the chemical distinction between image and non-image areas on a printing plate rather than physical relief differentiation. Such plates are referred to as planographic since the image and non-image areas are in the same plane. The plates are constructed so that, with proper treatment, the image areas are hydrophobic and oleophilic in order to be receptive to inks. The non-image areas are hydrophilic and water receptive. Typically, in the printing process, using prior art printing systems in which a dampening solution and an ink-containing solution are used, the surface of the lithographic plates is contacted with dampening rollers to transfer the dampening solution, such as water or an aqueous fountain solution, prior to contacting the plates with an ink-containing solution. The dampening solution spreads on the non-image area of the lithographic plate, but is unable to form a continuous layer on the image area of the plate. When subsequently contacted with an ink-containing solution, the aqueous layer on the non-image area of the plate inhibits the surface from accepting the ink, while the image areas remain free to accept the ink. With the exception of driographic plates (waterless plates) lithographic plates require a continuous supply of dampening solution to activate and maintain the distinction between ink-accepting image areas and ink-repelling non-image areas. Despite the differences in the hydrophobic/oleophilic nature of the image and non-image areas, in the absence of dampening solution, the ink-containing solution typically will wet both the image and non-image areas.

The use of a single fluid lithographic ink, e.g., an emulsion of lithographic inks in water, in lithographic printing processes is desirable to avoid problems encountered using dampening solutions. The need for suitable single fluid inks has been recognized for some time, since it would simplify the lithographic process, and potentially lithographic printing press design. However, development of useful single fluid lithographic inks has been difficult, including the problem of maintaining a clean non-image area accommodated by the single ink to water levels in the formulated printing emulsion. The problem is associated with the dependence of ink to water phase ratios on the image to non-image coverage area required. One such solution is the combination of a dampening solution with available lithographic inks. However, in general, methods of preparing an emulsion ink involving the addition of a dampening solution to available lithographic inks have been unsuitable because of the variable stability characteristics of such inks.

In order for a single fluid lithographic ink to be useful, it must be formulated so that the hydrophilic phase breaks out of the ink to maintain clean non-image areas, regardless of the degree of ink coverage area. This need for the emulsion to separate must be balanced against the requirement that sufficient stability in the ink exists to prevent the two phases from separating at any time prior to reaching the printing plate. Incompatibility will lead to distribution and transfer problems. Excessive stability will yield flow problems and hinder the release of the water phase to the plate. Acceptable emulsions, in order to have the desirable rheological and stability properties requires a balance of interfacial chemistry, however, the volumes of water which should be used (typically about 35–50% by volume), are beyond the interfacial capacities of traditional lithograhic inks.

Other attempts to avoid traditional lithographic inks and formulate a single fluid ink have been made. Some fluids use polyhydroxy-functional compounds and mercury salts, with lithographic plate treatments, however, such processes are very complex and undesirable from an operating standpoint due to use of toxic salts.

A further attempt to formulate a single fluid lithographic ink is found in U.S. Pat. No. 4,918,517. This ink emulsion is formed by combining an ink varnish with phosphoric acid and a polyol. A coloring agent is then provided to create an ink varnish resinous phase or ink vehicle. An aqueous solution having polyols is added thereby forming an emulsion, and fuel oil is blended into the emulsion as a non-aqueous diluent and stabilizer.

A single-fluid lithographic ink in the form of an ink composite has also been proposed, which includes a hydrophobic phase, including a vinyl resin having carboxyl functionality and a polyol phase in U.S. Pat. No. 6,140,392. U.S. Pat. No. 6,200,372 includes a formulation having a macromolecular resin binder, a rosin salt resin, an aqueous emulsion polymer, a pigment, a water-dispersible, soy bean-based polymer and a hydroxyethylene urea re-wetting agent.

In spite of these attempts, there is still a need in the art for a single fluid ink composition which demonstrates stability when subject to shear stress, but which breaks out into the ink and aqueous phase when appropriate. Further, it would be desirable to have such an ink which includes water that can break out when necessary or be re-emulsified with ease.

SUMMARY OF THE INVENTION

The present invention relates to a self-dampening ink composition comprising: (a) glycerol in an amount greater than 0 percent to about 10 percent by weight based on the total weight of the composition; (b) a nonionic surfactant having a hydrophilic/lipophilic balance of about 8 to about 20 in an amount of about 0.25 to about 2 percent by weight based on the total weight of the composition; and (c) water in an amount of about 20 to about 50 percent by weight based on the total weight of the composition, wherein the ink composition is capable of being used as a single fluid lithographic ink.

A method for lithographic printing is also provided which comprises directly wetting image and non-image areas of a lithographic plate with a self-dampening lithographic ink composition, wherein the composition comprises glycerol in an amount greater than 0 percent to about 10 percent by weight; a nonionic surfactant having a hydrophilic/lipophilic balance (HLB) of about 8 to about 20 in an amount of about 0.25 percent by weight to about 2 percent by weight; and water in an amount of about 20 to about 50 percent by weight, wherein the weight percentages are based on a total weight of the composition.

Further provided in a method of lithographic printing using a single fluid lithographic ink, is the improvement which comprises using a self-dampening ink composition comprising glycerol in an amount greater than 0 percent to about 10 percent by weight; a nonionic surfactant having a hydrophilic/lipophilic balance of about 8 and about 20 in an amount of about 0.25 percent by weight to about 2 percent by weight; and water in an amount of about 20 to about 50 percent by weight, wherein the weight percentages are based on a total weight of the composition.

DETAILED DESCRIPTION OF THE INVENTION

The present invention includes a self-dampening ink composition and an improved lithographic printing method which includes using the self-dampening ink composition of the present invention. The composition of the present invention generally includes glycerol, nonionic surfactants with a hydrophilic/lipophilic balance (HLB) value of about 8 to about 20, and water. The composition of the invention is self-dampening in that there is no need for use of additional water or dampening solutions when applying the ink compositions in lithographic printing methods. As used herein "single fluid" refers to a self-dampening ink for lithographic printing which is used alone, without dampening solutions or a separate source of water, to directly wet a lithographic plate in the hydrophilic areas while also wetting the hydrophobic areas.

For single fluid printing, the hydrophilic phase is incorporated into a hydrophobic phase (ink) and directly used for printing as described above. The present invention meets the requirements of a single fluid lithographic, self-dampening ink in that the hydrophilic phase breaks out of the ink in order to maintain clean non-image areas, regardless of ink coverage. Further, the need for the emulsion to break is balanced by the requirement that sufficient stability exists to prevent the two phases from separating at any time prior to reaching the printing plate even when subjected to shear in the printing operation. The stability does not hinder distribution and transfer or prevent an equilibrium from being obtained on the roller train. The ability of the phases to break out when appropriate prevents flow problems and does not hinder the release of the water phase to the plate. Thus, the proper emulsion rheology and stability for acceptable printing via the single fluid concept requiring a proper balance of interfacial chemistry is achieved by the present invention.

The potential effectiveness of the ink composition in use in a lithographic press is determined using several tests developed by applicants. The ink composition's non-image cleaning ability on a lithographic plate is evaluated using a quick peek proofer. A quick peek proofer is simply a rubber roller used to apply an ink film to a surface. The test was performed by measuring a volume of ink onto a roller and then distributing the ink on the non-image area of a conventional lithographic plate (such as Vistar series from KPG). The Quick Peek Proofer is available from the Thwing-Albert Instrument Company. The lack of ink reception in the non-image area is the positive test to assess composition using the proofer.

The stability of the emulsion and the presence of surface water are evaluated using a slipperiness test in a glass jar. The glass jar test was performed by placing emulsified ink into a glass jar. A positive test result was obtained in that the ink could move in the jar without ink sticking to the jar and without water separating from the emulsion. The rheological properties of the emulsion are evaluated using a rheometer. A Carri-Med CSL-550 rheometer was used. A flow sweep (shear stress vs. shear rate) was carried out and the maximum stress achieved before emulsion break was noted. Excessive stability or instabilities were noted by this test. A positive evaluation of these tests helps to indicate that the ink emulsion possesses the requirements for successful operation in a lithographic printing process.

The compositions of the present invention preferably incorporate minor amounts of glycerol which functions to help stabilize the hydrophilic phases in the ink prior to emulsification, as well as to help lubricate the non-image of the printing plate during printing. The amount of glycerol utilized is not critical, and from 0 weight percent to 10 weight percent, based on the total weight of the composition, can be incorporated. Preferably, glycerol is present in the composition in an amount up to about 6 weight percent, based on the total weight of the composition. More preferably, glycerol is present in the composition in an amount ranging from about 1 weight percent to about 3 weight percent, and most preferably in an amount of about 2 weight percent, based on the total weight of the composition.

Since the composition is a single fluid, self-dampening composition, it includes water as a dampening agent/hydrophilic phase within the formulation. Preferably, water is present in the composition in a range from about 20 weight percent to about 50 weight percent, based on the total weight of the composition. More preferably, water is present in the composition in an amount of from about 35 weight percent to about 50 weight percent, based on the total weight of the composition.

At least one non-ionic surfactant having a hydrophilic/lipophilic balance (HLB) of about 8 to about 20 is used in the present formulation. The presence of the non-ionic surfactant positively affects emulsion stability by releasing emulsified water from the emulsion efficiently. Higher HLB values have generally been found to be most effective. The surfactants may be in combination, but it is not necessary for them to be. It is, however, necessary for them to affect the ink in such a way so as to produce proper test responses indicative of the existence of a balanced emulsion. For the non-ionic surfactants, pH is not a factor.

It is preferred to include from about 0.25 weight percent to about 2 weight percent, and preferably from about 0.5 weight percent to about 1.5 weight percent, based on the total weight of the self-dampening ink composition, of at least one non-ionic surfactant having an HLB of from about 8 to about 20.

Suitable non-ionic surfactants are those having the desired HLB balance and which can include $C_{10}$–$C_{20}$ alkylphenol ethoxylates and polyethylene oxide derivatives of the same, $C_{10}$–$C_{20}$ polyoxyethylene alkylaryl ethers, $C_{10}$–$C_{24}$ fatty alchol ethoxylates, ethoxylates of alcohols derived from lanolin, ethoxylated monoglycerides, ethoxylated diglycerides, ethoxylated triglycerides, ethoxylated polyoxypropylene glycol and block copolymers of propylene oxide and ethylene oxide having a weight average molecular weight of about 2,500 to about 7,500. Other, more preferred examples of nonionic surfactants with a HLB between about 8 and about 20 that may be included in the ink composition of the present invention include silicone derived surfactants such as Silwet®, manufactured by CK Witco, for example Silwet® 7657 (Witco)(HLB 13.0–17.0), alkyl phenols and alkyl phenol polyethylene oxide derivatives such as Igepal® CA720 and CO430, available from Sigma-Aldrich, alkyl amines and alkyl amine polyethylene oxide derivatives, such as Synperonic® T, available from Uniqema, fatty acids and fatty acid polyethylene oxide derivatives such as Mazamide®, manufactured by BASF, propylene oxide/ethylene oxide block copolymers such as Synperonic® PE, available from Uniqema, such synperonic monomers being comprised of propylene oxide and ethylene oxide, for example Synperonic PE (Uniqema), fatty acid esters such as T-Maz® 80 wherein such sorbitan derivatives include POE(20) sorbitan monooleate (BASF)(HLB 15.0), polyglycosides such as Glucopon®, for example alkyl polyglycosides such as Glucopon® 425 (Henkel Glucopon)(HLB 13.1), polypropylene glycols such as Macol® P-2000 available from BASF or Macol OP-ethoylated alcohols such as Macol® OP12 (BASF)(HLB 14.6), and oils and fats such as Alkamul® EL-985 available from Rhodia. Most preferred are alkyl phenol polyoxyethylene oxide and/or polyglycosides alone or in combination.

Various other components can be included in the ink composition of the present invention. Mineral oil, or any suitable equivalent known or to be developed in the art, is preferably included as an emulsification vehicle. Mineral oil is preferably present in the formulation in an amount of about 10 weight percent to about 90 weight percent based on the total weight of the ink composition, more preferably from about 20 weight percent to about 50 weight percent and most preferably from about 40 weight percent to about 50 weight percent.

Various colorants, including dyes and, more preferably, pigments are used in the ink formulations of the present invention, alone or in combination. A wide range of pigments may be employed in the printing ink compositions of the present invention, including any suitable pigment or dye typically used or to be developed for lithographic printing. Non-limiting examples of useful pigments include various carbon blacks, Cl Pigment Yellows 12, 13 and 17; Cl Pigment Reds 2, 4, 48.2, 53.1, 57:1 and 81; Cl Pigment Oranges 13 and 34; Cl Pigment Black 7, Cl Pigment Blues 1, 15, 15.1 and 18; Cl Pigment Violets 1, 3 and 23; Cl Pigment Greens 1, 2 and 7; Cl Pigment Whites 6 and 18, combinations of these various pigments and similar colorants. Preferably, the pigment includes primarily standard ink grades of carbon black, or completely carbon black alone or with carbon black wetting agents such as asphaltum, pitches and bitumen. Preferably, the colorant is present in the formulation in an amount of from about 1 weight percent to about 30 weight percent based on the total weight of the composition, more preferably from about 1 weight percent to about 20 weight percent, and most preferably in an amount of about 5 weight percent to about 15 weight percent.

A binder varnish can also be included in the ink composition which includes a binder resin in an oil base for acting as a thixotropic/rheology adjusting agent and as a further solvent/vehicle for the oleophilic phase. All standard binder resins are possible. Such binder resins are not critical to the invention as the additives that provide the inventive composition are independent of the binder resin used. Suitable binder resins include those commercially available as Coblax® and as well as other hydrocarbon-containing varnishes including Gilsonite resin in Magie 470 oil and maleic anhydride-modified hydrocarbon in Magie 470 oil. Non-limiting examples of binder resins include: gilsonite, asphaltic resins (Coblax), hydrocarbon, modified hydrocarbon, phenolic, rosin, rosin esters, and modified rosins (phenolic, fumaric,maleic) esters.The binder resin, if used, is present in the formulation in an amount of about 1 weight percent to about 50 weight percent, preferably from about 2 weight percent to about 10 weight percent, based on the total weight of the ink composition.

Moreover, conventional amounts of typical additives useful in lithographic inks may also be included in the compositions of the present invention, including without limitation, organoclays, polyethylene wax, polytetrafluoroethylene wax, silicas, polyamides and aluminum chelates, low molecular weight hydrocarbon resins, and the like.

The invention will now be further described in accordance with the following non-limiting example:

EXAMPLE 1

The following ink compositions A and B were formulated as shown in Table 1 including all components in weight percentage amounts. The compositions were prepared from a standard formulation that except for water, surfactant and glycerol has already been prepared by standard techniques that do not require specific mixing procedure that is sensitive to order of addition.

TABLE I

| Component | Composition A | Composition B |
| --- | --- | --- |
| Mineral Oil (San Joaquin Refining 2000 SUS Petroleum Oil) | 47.00 | 47.35 |
| Carbon Black (Cabot CSX-372 (DBP value is 72)) | 13.00 | 13.00 |
| Binder Varnish (Coblax ®) | 2.00 | 2.00 |
| Glycerol | 2.00 | 2.00 |
| Water | 35.00 | 35.00 |
| Igepal ®CO430 (alkyl phenol polyethylene oxide) | — | 0.65 |
| Glycopon ® 425 (polyglycoside) | 1.0 | — |
| Total | 100.00 | 100.00 |

The effectiveness of the compositions A and B were evaluated by first determining the cleaning ability of the ink emulsion on a lithographic plate using a quick peek proofer. Next, the stability of the emulsion and surface water was evaluated using a slipperiness test in a glass jar. Finally, the rheology of the emulsions were measured on a rheometer. These tests indicated that the ink emulsions would perform successfully in a lithographic printing process based on classification as good to very good with regard to behavior that yields good behavior on press.

The invention also includes a method for lithographic printing which may include any acceptable lithographic printing process such as those described or referenced in U.S. Pat. Nos. 4,981,517 and 5,372,635, incorporated herein by reference. In the method of the invention, the image and non-image areas of a lithographic plate are directly wetted, that is without prior use of a dampening solution or water, with a self-dampening lithographic ink composition. Preferably, the self-dampening ink composition is one in accordance with the above description of the invention in which the composition includes glycerol in an amount greater than 0 weight percent to about 6 weight percent; a nonionic surfactant having a hydrophilic/lipophilic balance of about 8 to about 20 in an amount of about 0.25 weight percent to about 2 weight percent; and water in an amount of about 20 weight percent to about 50 weight percent, with all weight percentages being based on a total weight of the composition, and which may include any of the additives or additional preferred components noted above.

The invention also includes an improvement for any acceptable method of lithographic printing using a single-fluid lithographic ink known in the art or to be developed. The improvement includes using a self-dampening ink composition which is preferably any of the self-dampening ink compositions according to the invention as described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for lithographic printing comprising using a self-dampening lithographic ink composition comprising a glycerol; a nonionic surfactant having a hydrophilic/lipophilic balance of about 8 to about 20; and about 20 to about 50% by weight based on the total weight of the printing ink composition of water, wherein said ink composition is self-dampening and wherein the image area of the lithographic printing is hydrophobic.

2. The method of claim 1 wherein the self-dampening printing ink composition comprises glycerol in an amount of greater than 0% up to about 10 percent by weight; a nonionic surfactant having a hydrophilic/lipophilic balance of about 8 to about 20 in an amount of about 0.25 percent by weight to about 2 percent by weight; and water in an amount of about 20 to about 50 percent by weight; wherein the weight percentages are based on the total weight of the printing ink composition.

3. The method of claim 1 wherein the self-dampening printing ink composition comprises the glycerol in an amount of greater than 0% up to about 6 percent by weight; the nonionic surfactant in an amount of about 0.5 percent by weight to about 1.5 percent by weight; and the water in an amount of about 35 to about 50 percent by weight.

4. The method of claim 3 wherein the self-dampening printing ink composition comprises the glycerol in an amount of greater than 0% up to about 3 percent by weight.

5. The method of claim 4 wherein the self-dampening printing ink composition comprises the glycerol in an amount of about 2 percent by weight.

6. The method of claim 1 wherein the self-dampening printing ink composition comprises glycerol in an amount of greater than 0% up to about 10 percent by weight; a nonionic surfactant having a hydrophilic/lipophilic balance of about 8 to about 20 in an amount of about 0.25 percent by weight to about 2 percent by weight; water in an amount of about 20 to about 50 percent by weight; mineral oil in an amount of about 10 percent by weight to about 90 percent by weight; and colorant in an amount of about 1 percent by weight to about 30 percent by weight; wherein the weight percentages are based on the total weight of the printing ink composition.

7. The method of claim 6 wherein the self-dampening printing ink composition comprises glycerol the in an amount of greater than 0% up to about 6 percent by weight; the nonionic surfactant in an amount of about 0.5 percent by weight to about 1.5 percent by weight; the water in an amount of about 35 to about 50 percent by weight; the mineral oil in an amount of about 20 percent by weight to about 50 percent by weight; and the colorant in an amount of about 1 percent by weight to about 20 percent by weight.

8. The method of claim 7 wherein the self-dampening printing ink composition comprises glycerol the in an amount of about 2 percent by weight; the mineral oil in an amount of about 40 percent by weight; and the colorant in an amount of about 5 percent by weight to about 15 percent by weight.

9. The method of claim 1 wherein the nonionic surfactant is at least one member selected from the group consisting of silicone surfactant, alkyl phenol and polyethylene oxide derivative thereof, alkyl amine and polyethylene oxide derivative thereof, fatty acid amide and polyethylene oxide derivative thereof, block copolymer of propylene oxide and ethylene oxide, fatty acid ester, polyglycoside, polypropylene glycol, oil and fat.

10. The method of claim 1 wherein the self-dampening printing ink composition comprises binder resin.

11. The method of claim 1 wherein the self-dampening printing ink composition comprises glycerol the in an amount of greater than 0% up to about 3 percent by weight; a nonionic surfactant which is alkyl phenol polyethylene oxide or polyglycoside and is in an amount of about 0.5 percent by weight to about 1.5 percent by weight; water in an amount of about 35 to about 50 percent by weight; mineral oil in an amount of about 20 percent by weight to about 50 percent by weight; colorant in an amount of about 1 percent by weight to about 20 percent by weight, and binder resin in an amount of about 1 percent by weight to about 50 percent by weight.

12. The method of claim 1 wherein the colorant is carbon black in an amount of about 5 percent by weight to about 15 percent by weight, and the binder resin in an amount of about 2 percent by weight to about 10 percent by weight.

13. The method of claim 11 conducting in the absence of a dampening composition other than said self-dampening composition.

14. The method of claim 7 conducting in the absence of a dampening composition other than said self-dampening composition.

15. The method of claim 6 conducting in the absence of a dampening composition other than said self-dampening composition.

16. The method of claim 3 conducting in the absence of a dampening composition other than said self-dampening composition.

17. The method of claim 2 conducting in the absence of a dampening composition other than said self-dampening composition.

18. The method of claim 1 conducting in the absence of a dampening composition other than said self-dampening composition.

* * * * *